(12) United States Patent
Fan et al.

(10) Patent No.: US 11,543,692 B2
(45) Date of Patent: Jan. 3, 2023

(54) HIGH LASER DAMAGE THRESHOLD REFLECTIVE LIGHT ADDRESSING LIQUID CRYSTAL SPATIAL LIGHT MODULATOR FOR LINEARLY POLARIZED LIGHT AT 1053 NM

(71) Applicant: Shanghai Institute of Optics And Fine Mechanics, Chinese Academy of Sciences, Shanghai (CN)

(72) Inventors: Wei Fan, Shanghai (CN); Zhibo Xing, Shanghai (CN); Dajie Huang, Shanghai (CN); He Cheng, Shanghai (CN); Gang Xia, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 220 days.

(21) Appl. No.: 17/119,962

(22) Filed: Dec. 11, 2020

(65) Prior Publication Data

US 2021/0356800 A1    Nov. 18, 2021

(30) Foreign Application Priority Data

May 15, 2020   (CN) .......................... 202010412229.1

(51) Int. Cl.
   *G02F 1/1333*   (2006.01)
   *G02F 1/1362*   (2006.01)
   (Continued)

(52) U.S. Cl.
   CPC ...... *G02F 1/133362* (2013.01); *G02F 1/1337* (2013.01); *G02F 1/13439* (2013.01); *G02F 1/133502* (2013.01); *G02F 1/133524* (2013.01); *G02F 1/133553* (2013.01); *G02F 1/136277* (2013.01); *G02F 2202/10* (2013.01);
   (Continued)

(58) Field of Classification Search
   CPC ......... G02F 1/133362; G02F 1/133502; G02F 1/136277; G02F 2202/10; G02F 2203/12; G02F 1/3515
   See application file for complete search history.

(56) References Cited

U.S. PATENT DOCUMENTS

| | | | |
|---|---|---|---|
| 6,560,001 B1 * | 5/2003 | Igasaki | G02F 1/135 353/30 |
| 2021/0048704 A1 * | 2/2021 | Marshall | G02F 1/133753 |
| 2021/0349354 A1 * | 11/2021 | Abdulhalim | G02B 27/30 |

* cited by examiner

*Primary Examiner* — Jessica M Merlin
(74) *Attorney, Agent, or Firm* — Mei & Mark LLP; Manni Li

(57) ABSTRACT

A high laser damage threshold reflective optically addressed liquid crystal spatial light modulator for shaping 1053 nm linearly polarized light beams, comprising a computer-controlled LCoS electrical addressable spatial light modulator, polarization beam splitter, and polarizer, Liquid crystal cell, analyzer, AC power supply, where the liquid crystal cell comprises a transparent conductive film antireflection film layer, a transparent conductive film base layer, a first transparent conductive layer, a liquid crystal alignment layer, a liquid crystal layer, an alignment element, a reflective film layer, a light guide layer, and a second transparent conductive layer. By changing the transparent conductive layer material of the light-transmitting part of the liquid crystal cell from ITO to gallium nitride material, the damage threshold of the high-energy laser is improved, which facilitates application of beam shaping in high-power laser devices.

8 Claims, 3 Drawing Sheets

(51) Int. Cl.
*G02F 1/1335* (2006.01)
*G02F 1/1343* (2006.01)
*G02F 1/1337* (2006.01)
(52) U.S. Cl.
CPC ...... *G02F 2203/02* (2013.01); *G02F 2203/05* (2013.01); *G02F 2203/11* (2013.01); *G02F 2203/12* (2013.01)

HIGH LASER DAMAGE THRESHOLD REFLECTIVE LIGHT ADDRESSING LIQUID CRYSTAL SPATIAL LIGHT MODULATOR FOR LINEARLY POLARIZED LIGHT AT 1053 NM

CROSS-REFERENCE TO RELATED APPLICATION

The subject application claims priority on Chinese Application No. CN202010412229.1 filed on May 15, 2020 in China. The contents and subject matter of the Chinese priority application is incorporated herein by reference.

TECHNICAL FIELD

The present invention relates to liquid crystal devices, particularly, a high laser damage threshold reflective light addressing liquid crystal spatial light modulator for 1053 nm linearly polarized light.

BACKGROUND TECHNOLOGY

Liquid crystal spatial light modulator (LC-SLM), is an optical device that dynamically controls the amplitude, phase, and polarization of the light field in real time, which has important applications in beam shaping of large laser devices. For example, in the NIF (National Ignition Facility) device in the United States, the OMEGA-EP (Extended Performance) device, the LMJ (Laser Mêgajoule) device in Europe, and the "Shenguang III" device in China, the liquid crystal spatial light modulator is used to pre-shield the damage point, pre-compensate the beam intensity, and improve the beam intensity Uniformity and other aspects.

In the liquid crystal spatial light modulator, the light-addressable liquid crystal spatial light modulator is a spatial light modulator that does not require pixel electrodes and does not affect the original optical path. Compared with the common transmissive electrical addressing spatial light based on thin film transistors (TFT) modulator and the reflective electrical addressing spatial light modulator based on liquid crystal on silicon (LCoS), the light-addressable liquid crystal spatial light modulator not only avoids the low aperture ratio of the TFT spatial light modulator due to components such as non-transparent electrodes, but also avoids the LCoS spatial light modulator due to optical path distortion caused by black grid effect and other reasons.

When the light-addressable liquid crystal spatial light modulator is used in a large-scale laser device, its laser damage threshold is an important performance index. However, the currently used transparent conductive layer material indium tin oxide (ITO) has a low laser damage threshold, so that the overall laser damage threshold of the optically addressed liquid crystal spatial light modulator is low, which limits its application in high-power laser devices. Therefore, how to increase the damage threshold of the transparent conductive film and then the laser damage threshold of the light-addressable liquid crystal spatial light modulator has become an important research topic for the researchers.

A high laser damage threshold reflective optically addressed liquid crystal spatial light modulator for linearly polarized light at 1053 nm has been disclosed, however, the liquid crystal cell structure has a reflective film layer that hinders the electrical signal transmission in the light guide layer and the second conductive layer.

SUMMARY OF THE PRESENT INVENTION

The present invention provides a reflective light addressing spatial light modulator, which obtains a higher laser damage threshold while ensuring its laser response performance. Compared with the existing light addressable spatial light modulator where the ITO material used for the transparent conductive layer in the liquid crystal cell has a lower laser damage threshold, the present invention changes the transparent conductive layer material with light passing part from ITO to gallium nitride material, thus, the laser damage performance of the spatial light modulator is improved while ensuring the performance of the spatial light modulator.

In order to achieve the above technical objectives, the present invention provides a high laser damage threshold reflective light addressing liquid crystal spatial light modulator for 1053 nm linear polarized light, comprising a polarization beam splitter, a computer-controlled LCoS type electrical addressable spatial light modulator, a polarizer, a liquid crystal cell, an analyzer, and an AC stabilized power supply, characterized in that the liquid crystal cell is composed of a transparent conductive film antireflection film layer, a transparent conductive film base layer, a first transparent conductive layer, a first liquid crystal alignment layer, a liquid crystal layer, an alignment element, a second liquid crystal alignment layer, a reflective film layer, a light guide layer, a second transparent conductive layer; the first transparent conductive layer and the second transparent conductive layer use different materials, the light guide layer also serves as the second transparent conductive layer; the base layer is made of a material different from the transparent conductive film base layer, the reflective film layer is located between the second liquid crystal alignment layer (47) and the light guide layer, and the reflective film layer and the second transparent conductive layer are respectively coated on both sides of the light guide layer, an AC power supply is connected between the first transparent conductive layer and the second transparent conductive layer, and the alignment element is located between the first liquid crystal alignment layer and the second liquid crystal alignment layer and surrounds the liquid crystal layer.

In the present invention, after the readout light enters the transparent conductive film antireflection film layer, it sequentially passes through the transparent conductive film base layer, the first transparent conductive layer, the first liquid crystal alignment layer, the liquid crystal layer, and the second liquid crystal alignment layer, and after being reflected by the film (48), returns to the original path and outputs; after the writing light is incident from the second transparent conductive layer, the electrical signal on the optical guide layer is modulated, and then returned to the original path after being reflected by the reflective film layer (48); the first transparent conductive layer has a transmittance of 1053 nm polarized light at above 70%, and a 1053 nm pulsed light with a pulse width of 10 ns has a damage threshold at above 1 J/cm2.

In the present invention, the transparent conductive film uses n-type doped gallium nitride or p-type doped gallium nitride, where the n-type doped gallium nitride uses silicon gallium nitride with a carrier concentration of $1*10^{18}$ cm$^{-3}$ to $1*10^{19}$ cm$^{-3}$ and a thickness of 0.3 mm to 0.5 mm; and the p-type doped gallium nitride uses magnesium-doped gallium nitride with a carrier concentration of $1*10^{18}$ cm$^{-3}$ to $1*10^{19}$ cm$^{-3}$ and a thickness of 0.3 mm to 0.5 mm.

In the present invention, the second transparent conductive layer is a transparent conductive layer.

In the present invention, the material used for the second transparent conductive layer is indium tin oxide.

In the present invention, the material used for the optical guide layer is bismuth silicate (BSO).

The principle of the present invention is that, as the laser damage threshold of gallium nitride material is higher than that of ITO material commonly used in transparent conductive layers, by replacing ITO with gallium nitride material in the transparent conductive layer part of the reflective light addressing liquid crystal spatial light modulator, the laser damage threshold of the reflective light-addressable liquid crystal spatial light modulator is improved; by changing the position of the reflective film layer in the liquid crystal cell from between the light guide layer and the second transparent conductive layer to between the liquid crystal alignment layer and the light guide layer and the light guide layer and the second transparent conductive layer on the same side, the electrical signal transmission between the light guide layer and the second transparent conductive layer is improved; and because the writing light and the reading light are incident in different directions, the device no longer needs to add a dichroic mirror and a reading light exit window, which simplifies the liquid crystal spatial light modulator the overall structure.

Compared with the existing technology, the advantages and characteristics of the present invention are: based on the use of gallium nitride material in the transparent conductive layer in the optical path of the spatial light modulator, the higher laser damage threshold of the gallium nitride material is used to increase the overall laser damage threshold of the optically addressable liquid crystal spatial light modulator, which broadens the optical addressing based on the application range of the liquid crystal spatial light modulator in the high-energy laser device; by changing the position of the reflective film layer in the liquid crystal cell, the electrical signal transmission between the light guide layer and the second transparent conductive layer is improved, and the liquid crystal overall structure of the spatial light modulator is simplified.

The reference numbers in the figures refer to the following structures:

1—polarization beam splitter (420 nm to 680 nm); 2—LCoS-type electrically addressed spatial light modulator controlled by computer; 3—polarizer; 4—liquid crystal cell; 5—analyzer; 6—AC power supply;

41—transparent conductive film antireflection film layer; 42—transparent conductive film base layer; 43—first Transparent conductive layer; 44—first liquid crystal alignment layer; 45—liquid crystal layer; 46—aligner; 47—second liquid crystal alignment layer; 48—reflective film layer; 49—light guide layer; 410—second transparent conductive layer;

30—liquid crystal cell of the reflective light-addressable liquid crystal spatial light modulator; 31—1053 nm linear polarization light source; 32—diaphragm; 33 and 34—lens groups; 35—charge coupled device (CCD); 36—computer.

DETAILED DESCRIPTION OF THE INVENTION

The present invention is further described in conjunction with the embodiments and drawings, but the protection scope of the present invention should not be limited accordingly.

Figure 1:
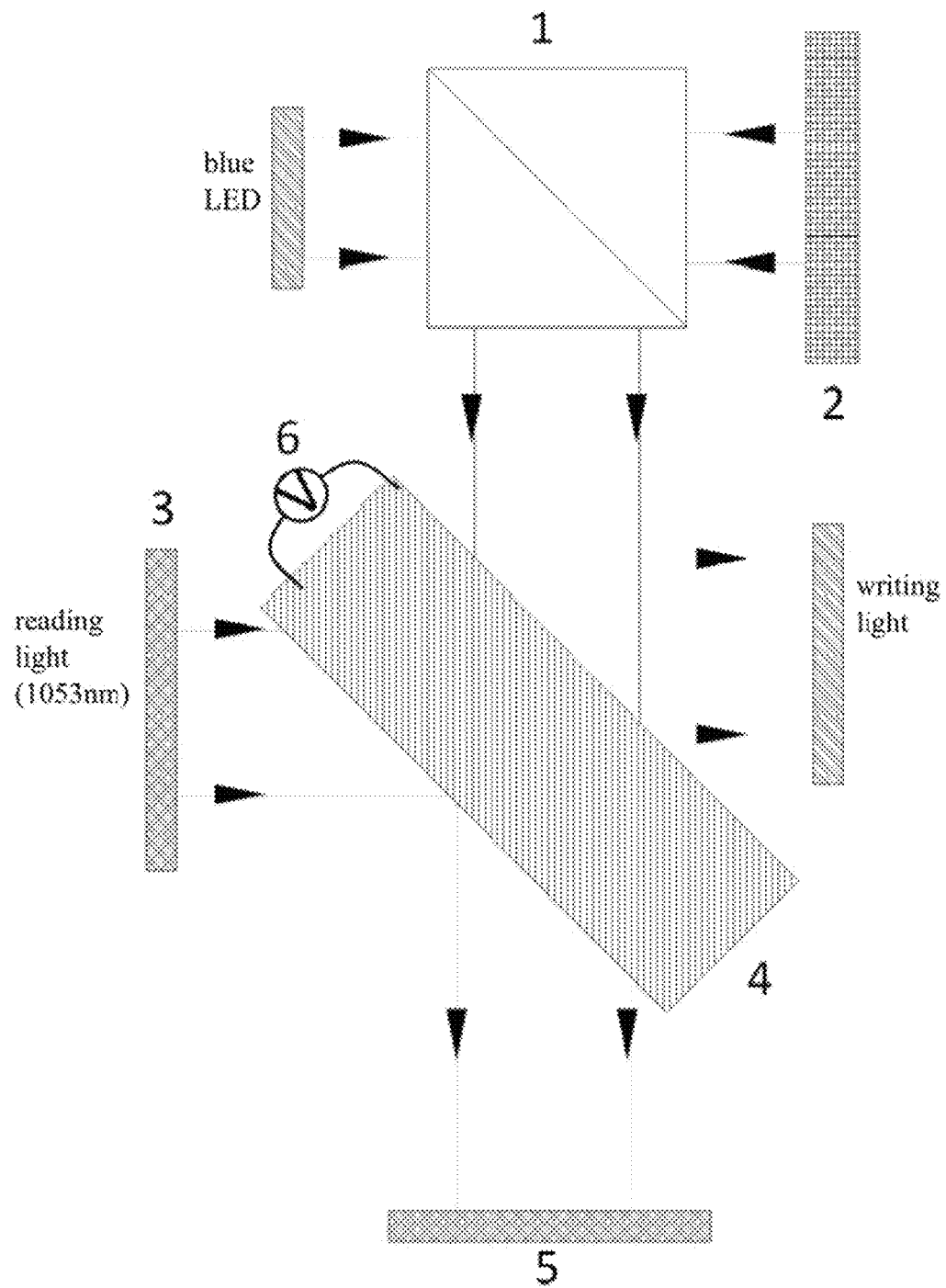
FIG. 1 shows the structure of the reflective optically addressable liquid crystal spatial light modulator according to one embodiment of the present invention.

As shown in FIG. 1, the structure of the high damage threshold reflective light-addressable liquid crystal spatial light modulator of the present invention comprises a polarization beam splitter (1), a computer-controlled LCoS type electrical addressable spatial light modulator (2), a polarizer (3), a liquid crystal cell (4), an analyzer (5), and an AC power supply (6). The liquid crystal cell (4) is placed obliquely. After writing light input from the 480 nm blue LED, it passes through the LCoS type electrical addressing spatial light modulator (2) to obtain a binary intensity distribution of the pixel structure, and then irradiates the liquid crystal cell (4) after passing through the polarization beam splitter (1), while the optical signal modulated by the LCoS type electrical addressing spatial light modulator (2) is converted into an electrical signal, and the 1053 nm linearly polarized readout light which passes through the polarizer (3) and enters from the other side of the liquid crystal cell (4). Then, the light is modulated by the liquid crystal cell (4) and then passes through the analyzer (5) out, while the polarization direction of the polarizer (3) and the analyzer (5) is parallel to the polarization direction of the 1053 nm linear polarization readout light.

Figure 2:
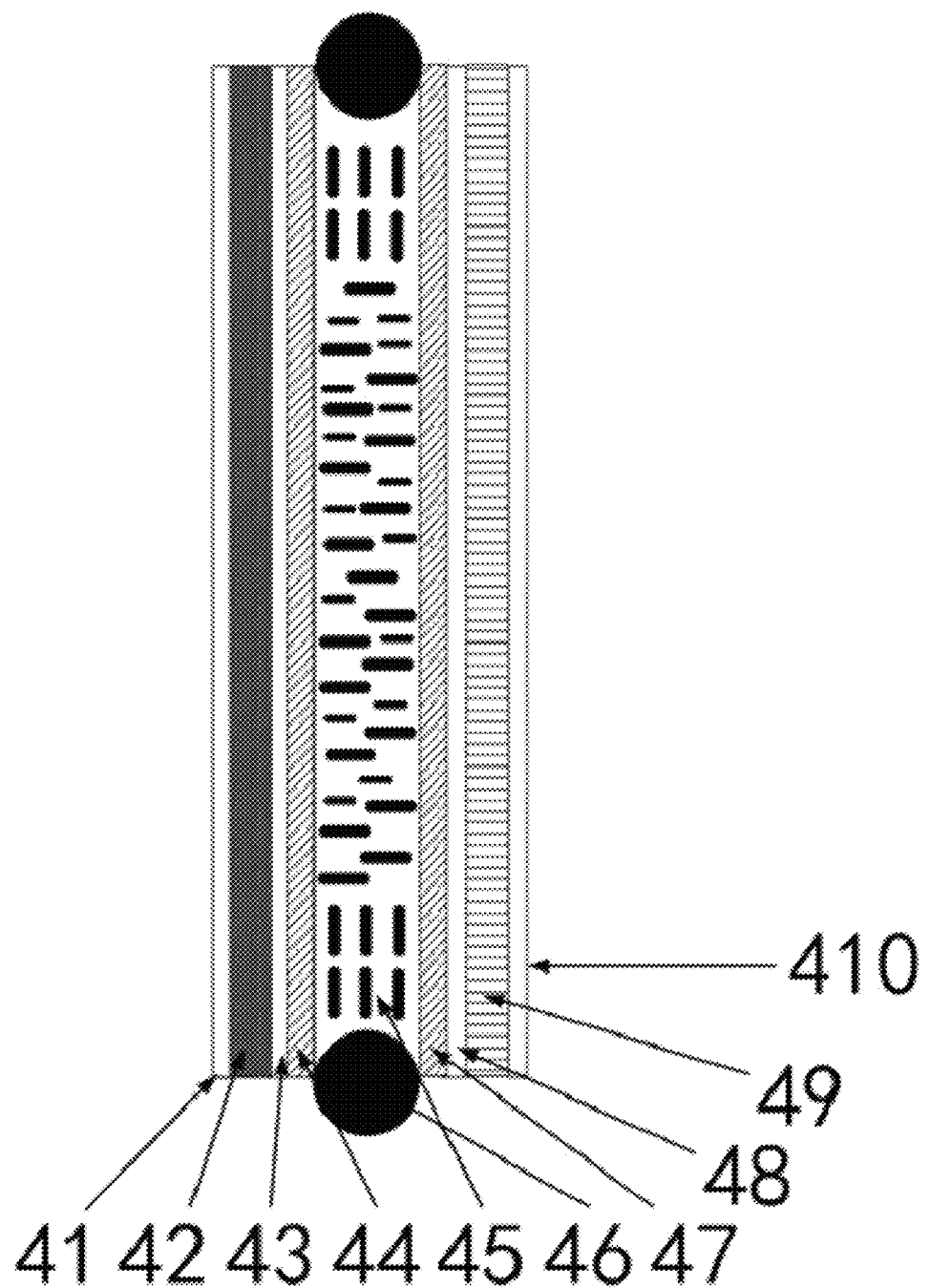
FIG. 2 shows the structure of the liquid crystal cell of the reflective light-addressable liquid crystal spatial light modulator in one embodiment of the present invention.

As shown in FIG. 2, the structure of the liquid crystal cell (4) comprises a transparent conductive film antireflection film layer (41), a transparent conductive film base layer (42), a first transparent conductive layer (43), a first liquid crystal alignment layer (44), a liquid crystal layer (45), an alignment element (46), a second liquid crystal alignment layer (47), a reflective film layer (48), a light guide layer (49), and a second transparent conductive layer (410). The reflective film layer (48) and the second transparent conductive layer (410) are respectively coated on both sides of the light guide layer (49). After the readout light enters the transparent conductive film antireflection film layer (41) of the liquid crystal cell (4), it sequentially passes through the transparent conductive film base layer (42), the first transparent conductive layer (43), the first liquid crystal alignment layer (44), the liquid crystal layer (45), and the second liquid crystal alignment layer. After the second liquid crystal alignment layer (47) is transferred, it is reflected by the reflective film layer (48) and then returned to the original path and output. The writing light is incident from the second transparent conductive layer (410). After the electrical signal is modulated on the light guide layer (49), it is reflected by the reflective film layer (48) and sent its way back in the former route. The alignment element (46) is located between the first liquid crystal alignment layer (44) and the second liquid crystal alignment layer (47), surrounds the liquid crystal layer (45), and functions to fix the width of the liquid crystal layer (45). The AC power supply (6) is connected between the first transparent conductive layer (43) and the second transparent conductive layer (410).

As shown in FIG. 1, the liquid crystal cell is placed obliquely in the optical path to prevent the incident light from the liquid crystal cell from overlapping with the emitted light.

The first transparent conductive layer (43) and the second transparent conductive layer (410) use different materials.

The liquid crystal layer (45) is a 90° twisted phase alignment liquid crystal, and the thickness d of the liquid crystal layer and the birefringence Δn of the liquid crystal satisfy 2dΔn=√3.

The material of the optical guide layer (49) should satisfy the following requirements: first, the electrical conductivity increases with the increase of the light intensity of the 480 nm writing light and has nothing to do with the light intensity of the 1053 nm readout light; second, the transmittance of the linear polarized light at 1053 nm is high enough; third, it may work as the base layer for the reflective film layer (48) and the second transparent conductive layer (410). Suitable material generally includes bismuth silicate (BSO) or zinc oxide (ZnO).

The AC power supply connected between the first transparent conductive layer (43) and the second transparent conductive layer (410) has a frequency of 100 Hz to 1000 Hz, and its working voltage is determined according to the following principles: when the light guide layer (49) of the liquid crystal cell 4 has no writing light irradiation, the partial pressure of the liquid crystal layer (45) is less than its threshold voltage; when writing light is irradiated on the light guide layer (49) of the liquid crystal cell (4), the partial pressure of the liquid crystal layer (45) is greater than its saturation voltage.

The first transparent conductive layer (43) in the liquid crystal cell (4) has a transmittance of greater than 70% to 1053 nm polarized light, and the damage threshold of 1053 nm pulse light with a pulse width of 10 ns is greater than 1 J/cm$^2$, and its material uses doped gallium nitride material, generally silicon-doped gallium nitride (n-type doping) or magnesium-doped gallium nitride (p-type doping). The carrier concentration of silicon-doped gallium nitride used is $1*1018$ cm$^{-3}$ to $1*1019$ cm$^{-3}$, and the thickness is 0.3 mm to 0.5 mm. The carrier concentration of magnesium-doped gallium nitride used is $1*1018$ cm$^{-3}$ to $1*1019$ cm$^{-3}$, and the thickness is 0.3 mm to 0.5 mm.

The second transparent conductive layer (410) in the liquid crystal cell 4 may generally be an indium tin oxide (ITO) material.

Figure 3:
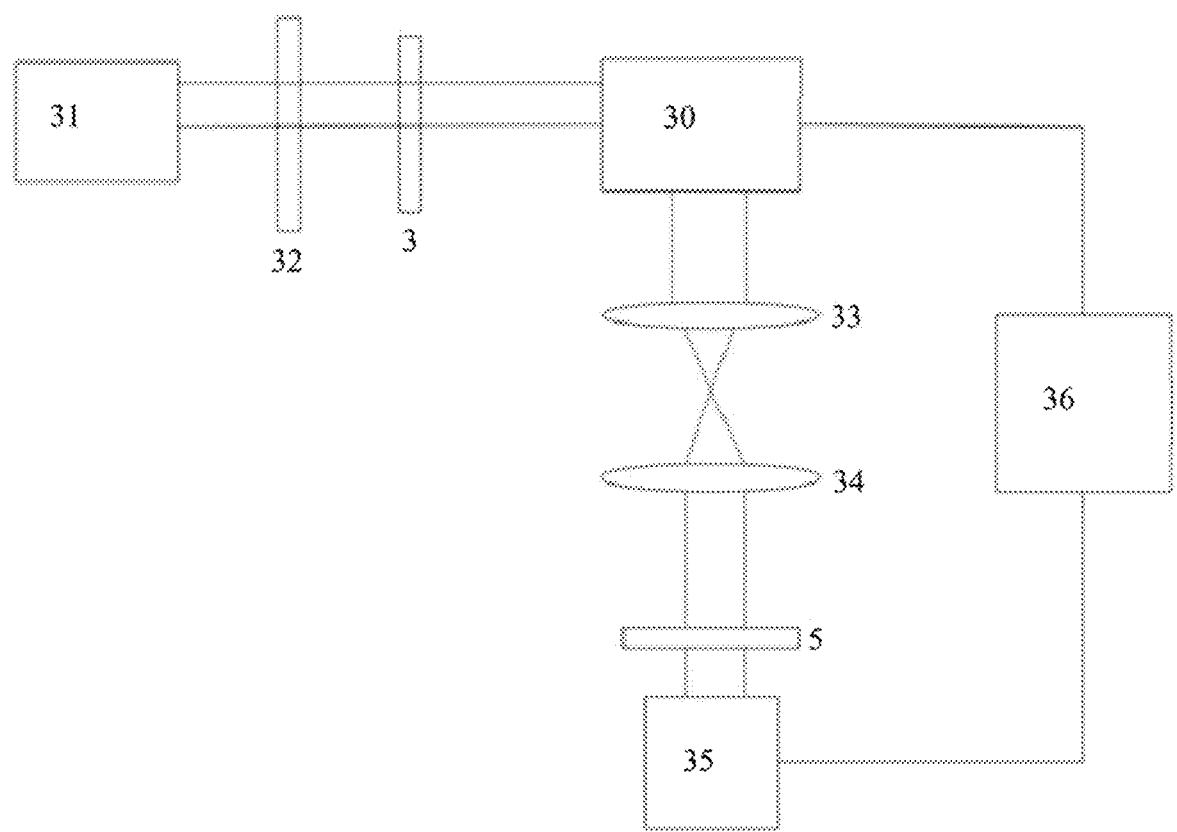
FIG. 3 shows the experimental optical path for intensity modulation of 1053 nm linear polarization using one embodiment of the reflective light-addressable liquid crystal spatial light modulator of the present invention.

As shown in FIG. 3, the optical path of intensity modulation of 1053 nm linear polarization using one embodiment of the modulator of the present invention comprises the 1053 nm linear polarization light source 31, diaphragm 32, polarizer 3, modulator of the present invention 30, lens 33, lens 34, analyzer 5, CCD 35, and computer 36, where the directions of the polarizer 3 and the analyzer 5 are parallel to the polarization direction of the light source.

We claim:

1. A liquid crystal spatial light modulator, comprising
a polarization beam splitter (1),
a computer-controlled LCoS electrical addressable spatial light modulator (2),
a polarizer (3),
a liquid crystal cell (4),
an analyzer (5), and
an AC power supply (6),
wherein the liquid crystal cell (4) further comprises
a transparent conductive film antireflection film layer (41),
a transparent conductive film base layer (42),
a first transparent conductive layer (43),
a first liquid crystal alignment layer (44),
a liquid crystal layer (45),
an aligner (46),
a second liquid crystal orientation layer (47),
a reflective film layer (48),
a light guide layer (49),
a second transparent conductive layer (410),
wherein the first transparent conductive layer (43) and the second transparent conductive layer (410) use different material;
the light guide layer (49) also serves as a base layer of the second transparent conductive layer (410) and uses a material different from the transparent conductive film base layer (42);
the reflective film layer (48) is located between the second liquid crystal orientation layer (47) and the light guide layer (49);
the first transparent conductive layer (43) and the second transparent conductive layer (410) are connected with an AC power supply (6);
the aligner (46) is located on the first liquid crystal alignment layer (44) and the second liquid crystal alignment layer (47) and surrounds the liquid crystal layer (45); and
the modulator is for linearly polarized light at 1053 nm.

2. The modulator according to claim 1, wherein a read-out light enters the transparent conductive film antireflection film layer (41), sequentially passes through the transparent conductive film base layer (42), the first transparent conductive layer (43), the first liquid crystal alignment layer (44), the liquid crystal layer (45), and the second liquid crystal alignment layer (47), and returns and is output through the same optical path after being reflected by the reflective film layer (48); and after a writing light is incident from the second transparent conductive layer (410) and then returned to the original path after being reflected by the reflective film layer (48), an electrical signal on the light guide layer (49) is modulated by the writing light. Consequently, the read-out light is modulated by the electrical signal.

3. The modulator according to claim 1, wherein the first transparent conductive layer (43) has a transmittance of greater than 70% for 1053 nm polarized light and damage threshold fro a pulse width at 10 ns and 1053 nm pulsed light of greater than 1 J/cm$^2$.

4. The modulator according to claim 1, wherein the first transparent conductive layer (43) is an n-type silicon-doped gallium nitride film or a p-type Magnesium-doped gallium nitride film, and the first transparent conductive layer (43) has a carrier concentration at $1*1018$ cm$^{-3}$ to $1*1019$ cm$^{-3}$ and thickness of 0.3 mm to 0.5 mm.

5. The modulator according to claim 1, wherein the second transparent conductive layer (410) is a transparent conductive layer.

6. The modulator according to claim 1, wherein material used for the second transparent conductive layer (410) is indium tin oxide (ITO).

7. The modulator according to claim 1, wherein material used for the light guide layer (49) is bismuth silicate (BSO).

8. The modulator according to claim 1, wherein material used for the light guide layer (49) is zinc oxide (ZnO).

* * * * *